United States Patent
Someno

(12) 
(10) Patent No.: US 6,641,704 B2
(45) Date of Patent: Nov. 4, 2003

(54) METHOD FOR MANUFACTURING AN OPTICAL FILTER HAVING LAMINATE FILM

(75) Inventor: Yoshihiro Someno, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 10/071,755

(22) Filed: Feb. 6, 2002

(65) Prior Publication Data
US 2002/0121434 A1 Sep. 5, 2002

(30) Foreign Application Priority Data
Mar. 5, 2001 (JP) ........................................ 2001-059787

(51) Int. Cl.$^7$ .............................................. C23C 14/34
(52) U.S. Cl. ............................. 204/192.12; 204/192.11
(58) Field of Search ...................... 204/192.11, 192.12, 204/192.15, 192.22, 192.26, 192.28, 298.06

(56) References Cited

U.S. PATENT DOCUMENTS 4,142,958 A  *  3/1979  Wei et al. .............. 204/192.11
6,115,180 A      9/2000  Hirai et al. ................. 359/586
6,287,430 B1 *  9/2001  Matsumoto et al. ... 204/192.26

* cited by examiner

Primary Examiner—Steven H. VerSteeg
(74) Attorney, Agent, or Firm—Beyer Weaver & Thomas

(57) ABSTRACT

A plurality of composite target materials containing a plurality of metal elements and oxygen, wherein the mix ratio of the metal elements is different individually for each of the target materials, are disposed in a chamber of a sputtering apparatus. The targets are sputtered one by one successively by use of a common ion gun to thereby form successively a laminate film comprising uniform films having a precise film thickness on a surface of a substrate so that the refractive index of the laminate film changes stepwise.

4 Claims, 3 Drawing Sheets

METHOD FOR MANUFACTURING AN OPTICAL FILTER HAVING LAMINATE FILM

BACKGROUND OF THE INVENTION

1. Field of the Invention

This invention relates to a method for manufacturing an optical filter having a laminate comprising a plurality of films that are different in the refractive index stepwise.

2. Description of the Related Art

A method in which a plurality of lights that are different in wavelength are transmitted in an optical fiber has been employed to transmit a lot of data in the field of optical communication. This method depends on the property of the light that lights having different wavelengths do not interfere each other and behave independently. In the communication technology of this type, an optical filter for separating a laser light into laser lights of individual wavelengths is used on the input side and on the output side of an optical fiber.

It is required for an optical filter of this type to separate the wavelength of the light into finely divided bands. The refraction index gradient type filter is used as an optical filter of this type. The refraction index of the refraction index gradient type optical filter changes successively depending on the depth of laminate thickness of the film, and the light reflection of high order wavelength lights is prevented with respect to the transmission wavelength light by using an refractive index gradient type optical filter.

A refraction index gradient type optical filter is formed by means of TSH technique, helicon beam sputtering technique, or ion beam sputtering technique. For example, a plurality of targets having different refractive indexes such as $TiO_2$ target and $SiO_2$ target are subjected to ion beam sputtering by use of separate ion guns in a vacuum vessel, and the sputtering yield is controlled individually to form a film on a glass substrate. Thereby, a film having a laminate structure in which the refractive index changes depending on the depth of laminate thickness is formed on a glass substrate.

However, in the case of the conventional method in which two targets and two ion guns are used, the mix ratio of two types of material should be controlled precisely to obtain a film having a desired refractive index, and it is required to control the sputtering ratio with continuous accurate monitoring of the refractive index of the film. Also in the case of the optical filter of this type, it is required to change the refractive index stepwise for every film thickness while confirming that the monitored optical film thickness of a layer is identical with the design value. In this case, it is required that the refractive index difference between adjacent films should be small and that the boundary between adjacent films should be defined clearly. Therefore, it is required that the sputtering ratio of two materials should be controlled precisely from the initial stage of film forming of each film, and such a requirement is not satisfied practically.

Furthermore, another method for changing the refractive index stepwise in which a plurality of materials having different refractive indexes, for example, $TiO_2$, $Ta_2O_5$, $ZrO_2$, and $Sio_2$, are combined has been used conventionally. However, the selectable range of the refractive index is limited, and particularly in the case where it is required to minimize the refractive index difference at the boundary plane between adjacent films, the selectable range is limited extremely.

Furthermore, in addition to the selectivity of the refractive index, the boundary between laminated layers is not smooth and a film is not uniform, and such irregularities may cause a problem. In the case of an amorphous film, because deposited particles that have been deposited on a substrate are not rearranged on the substrate through the film growing process, the uniformity and smoothness at the boundary are poor due to generation of particles in the film, and such irregularities cause light scattering and deviation from the designed performance.

The present invention has been accomplished to solve the abovementioned problem, and it is the object of the present invention to provide an optical filter characterized in that the refractive index is uniform within a predetermined film thickness and the film thickness of a film having the uniform refractive index is controlled precisely, a laminate film having the refractive index that changes stepwise can be formed, the slight refractive index difference between adjacent layers and the wide range refractive index selection are not limited, the boundary plane between films is smooth, and the refractive index difference is discrete, and to provide a method for manufacturing this type of optical filter.

SUMMARY OF THE INVENTION

A method for manufacturing an optical filter of the present invention is characterized in that a plurality of target materials containing a plurality of metal elements or metal oxides of the metal elements are disposed in a chamber of a sputtering apparatus, a mix ratio and/or types of the metal elements are differentiated between the target materials, the target materials are selected one by one successively to form a laminate film comprising a plurality of layers having refractive indexes that change stepwise at a boundary of an interface plane between adjacent films on a substrate.

The target material is preferably fine particle mixture of two or more metal oxides, and in this case it is preferable that the fine particle mixture contains materials having the refractive indexes that are different from each other discretely. For example, the combination of $Ta_2O_5$ and $SiO_2$ or combination of $TiO_2$ and $SiO_2$ is most preferably used in view of the stress and refractive index of a film.

Furthermore, it is preferable that the target material is alloy that contains two or more metal elements and oxides of these elements to thereby balance between the absorptance and high refractive index easily. Examples of such material include, for example, alloy oxide of Al—Si or alloy oxide of Pb—Si.

It is preferable that an inert gas ion beam is used as sputtering particles ejected against the target material in the manufacturing method of the present invention.

In a method for manufacturing an optical filter of the present invention, a particle mixture of two or more types of metal oxides or a particle mixture of alloy oxides is used, and a plurality of target materials having respective different refractive indexes are used selectively to thereby laminate films having uniform refractive indexes successively that match with the designed structure while controlling the optical film thickness precisely.

DETAILED DESCRIPTION OF THE PREFERRED EMBODIMENTS

Figure 1A:
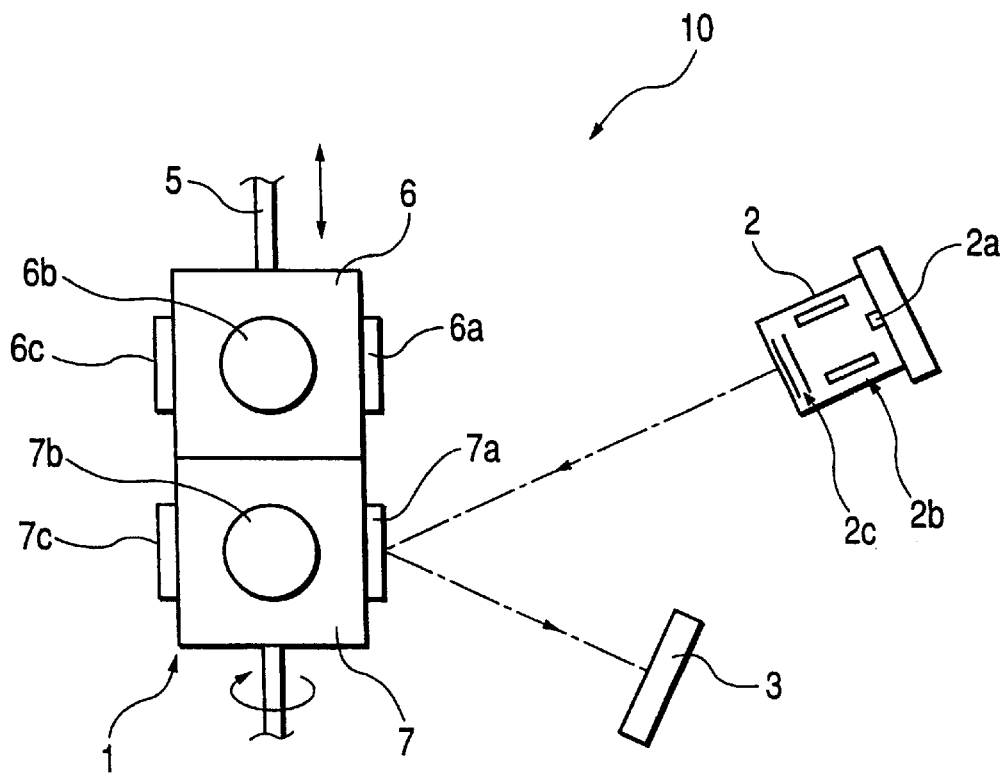
FIG. 1A is a schematic front view showing a laminate manufacturing apparatus of the present invention.
Figure 1B:
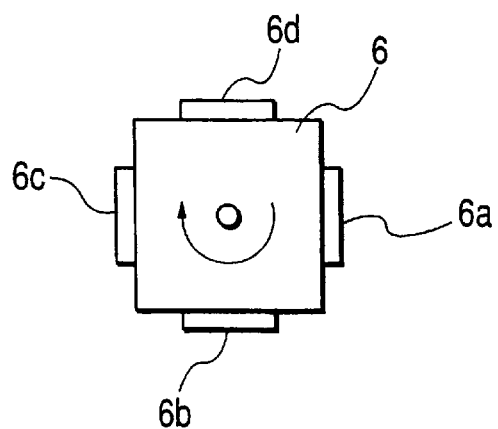
FIG. 1B is a schematic plan view of a target selector viewed from p-side showing a laminate manufacturing apparatus of the present invention.

FIG. 1A and FIG. 1B are schematic views showing one example of a manufacturing apparatus used for a method for manufacturing an optical filter of the present invention, FIG. 1A is a front view and FIG. 1B is a plan view of a target selector viewed from P-side.

A manufacturing apparatus 10 shown in FIG. 1A and FIG. 1B is an apparatus that is capable of ion sputtering, and a target selector 1, an ion gun 2, and a glass substrate 3 are disposed in the same vacuum chamber.

The target selector 1 is provided with identical cubic rotors 6 and 7, and these rotors 6 and 7 are linked vertically. Four side faces of the respective rotors 6 and 7 have composite target materials (6a to 6d, 7a to 7d; character 7d is not shown). The target selector 1 is rotatable round the support shaft 5 and provided with a selection mechanism that is movable linearly along the axial direction.

The composite target materials contains two or more identical metal elements and oxygen. The mix ratio of the metal element is different for each target material.

As shown in FIG. 1A and FIG. 1B, the ion gun 2 is disposed toward the target selector 1 on the side of the rotors 6 and 7. The ion gun 2 is provided with an argon ion ($Ar^+$) generator 2a, a discharge chamber 2b for converting argon ions to plasma, and a plurality of grids 2c for accelerating argon ions disposed in parallel. For example, a high voltage as high as 1100 volts is applied between the grids 2c to accelerate argon ions between the grids 2c, and a high speed argon ion beam is ejected. The ion is by no means limited to argon, and krypton or xenon may be used instead of argon.

The composite target materials 6a to 6d and 7a to 7d are mixtures containing a plurality of metal elements and oxides, for example, Ti (titanium) and Si (silicon) are used as the metal elements. It is required that the metal elements and oxides are ejected in the same proportion as that of metal elements of the target material from the target material when the ion beam is irradiated from the ion gun 2. To realize the abovementioned condition, it is required that the aggregates of Ti and the aggregates of Si are fine, and the Ti aggregates and the Si aggregates are distributed homogeneously throughout the composite material so that the mix ratio is uniform at any place of the composite target.

On consideration of the above, a glassy composite target containing oxides of metal elements is used in the present embodiment. In the case where the metal elements are Ti and Si, the target material is a glassy material in which $TiO_2$ and $SiO_2$ are dispersed in matrix fashion binodal or spinodal. Alloy may be used as the target material in which the aggregate of metal elements is fine and the mix ratio of the metal elements is homogeneous at any place.

The powder metallurgy technique may be used preferably as a method for making a composite target material consisting of mixture or alloy. For example, powders of oxides of two or more types of metal elements are mixed at a desired proportion, and the mixture is treated metallurgically at a proper temperature and pressure to form a homogeneous composite target material. Particularly, metallurgic technique in which $SiO_2$ is used is suitable to form a glassy composite target material.

The mix ratio of powders of the metal oxides and a mix ratio of metal powders can be controlled finely by means of power metallurgy technique.

Next, a method for manufacturing an optical filter in which the abovementioned manufacturing apparatus will be described herein under.

An ion beam is applied onto any one of composite target materials 7a to 7d of the target selector 1 to eject the metal elements and oxygen from the composite target material and the ejected metal elements and oxygen are converted to plasma, and a film consisting of radical metal elements and oxygen is formed on the surface of the glass substrate 3. Because the film is obtained from a single composite target material by means of sputtering, distribution of the metal elements and oxygen is homogeneous in the film. In the case where a glassy composite target material is used, a film obtained from a single composite target material by means of sputtering is glassy, and the refraction index with respect to light transmission is uniform in the film.

In the case where alloy target material is used, an amorphous film containing the metal elements and oxygen is formed by introducing oxygen gas into a manufacturing apparatus.

Because a single composite target material is sputtered by use of a single ion gun, an optical film thickness can be controlled precisely so that a film matching with the design value is obtained, and the refraction index error is reduced.

After any one of composite target materials has been sputtered to form the uniform film having a precise thickness on the glass substrate 3, the support shaft 5 of the target selector 1 is turned or the support shaft 5 is moved toward the axis direction to select another composite target material disposed on a different face of the rotor 6 or 7. The selected composite target material is sputtered in the same manner as described hereinabove. By repeating the abovementioned process, films 11, 12, 13, 14, . . . having the refraction index different from each other are laminated on the surface of the glass substrate 3 as shown in FIG. 3.

The films 11, 12, 13, 14, . . . are homogeneous films having the same mix ratio as that of the metal elements of the respective selected composite target materials. In other words, each film contains the same metal elements, namely Ti and Si, and the mix ratio of the metal elements in each film is different each other. As the result, the films 11, 12, 13, 14, . . . have the refractive index for light transmission that is different stepwise. Furthermore, because each film is formed by means of sputtering by use of a single target material, and the target material is glassy or alloy composite containing the elements, the refractive index is uniform in a single film and the refractive index is different between vertically adjacent films at the border.

Figure 3:
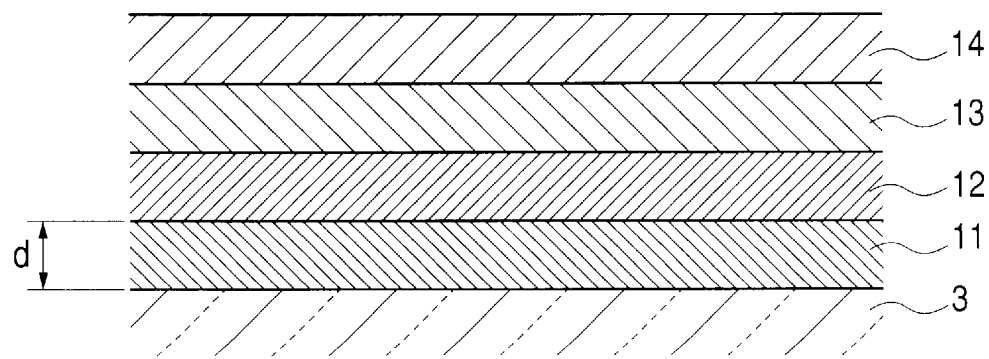
FIG. 3 is an enlarged cross sectional view showing a laminate film on a substrate.

Because the target material is selected successively and the respective target materials are sputtered by use of the same ion gun, the film thickness d of the respective films 11, 12, 13, 14, . . . shown in FIG. 3 are formed precisely with a minimized error.

Figure 2:
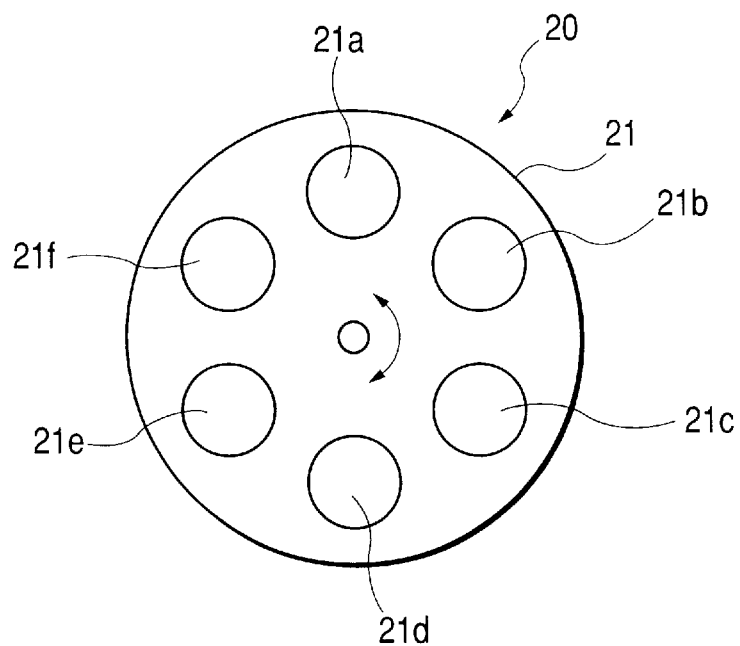
FIG. 2 is a plan view showing a modified example of the target selector.

A target selector 20 shown in FIG. 2 may be used instead of the target selector 1 for the manufacturing apparatus 10. In the case of the target selector 20, a plurality of composite target materials (21a to 21f) having different mix ratios of the metal elements are disposed on the surface of a disk 21 that is turnable by a desired angle successively. In the target selector 20, after any one of the composite target materials is sputtered by use of the ion gun to form a film having a film thickness d, the disk 21 is turned to select the next target material, and the next film is formed by sputtering.

It is not necessary that all the composite target materials shown in FIG. 1A, FIG. 1B, and FIG. 2 contain the same metal elements, but the metal element combination may be selected arbitrarily for individual composite targets as long as films formed from the respective composite target materials by sputtering are different stepwise in the refractive index correspondingly to the mix ratio of the metal element. Examples of the metal element include Ta (tantalum), Al (aluminum), Nb (niobium), Zr (zirconium), Bi (bismuth), Y (yttrium), La (lanthanum), and Sb (antimony) in addition to the abovementioned Ti and Si.

Figure 4:
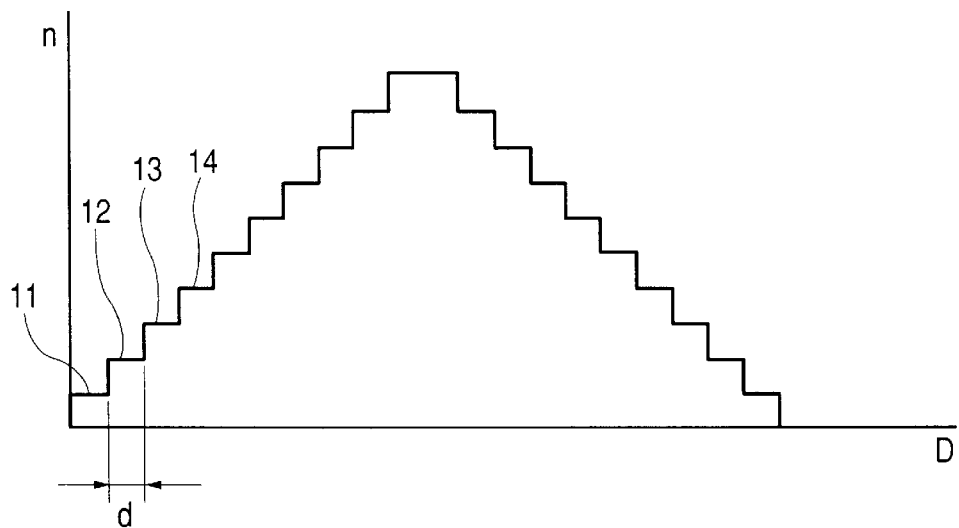
FIG. 4 is an explanatory diagram showing the relation between the film thickness of a laminate film and the refractive index.
Figure 5:
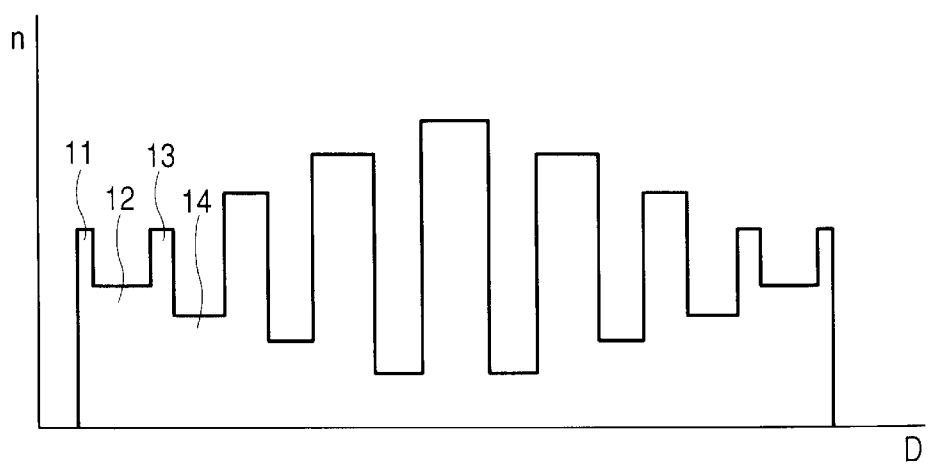
FIG. 5 is an explanatory diagram showing the relation between the film thickness of a laminate film and the refractive index.

FIG. 4 and FIG. 5 show the relation between the film thickness D of a laminate film of an optical filter of the present invention formed according to the abovementioned manufacturing method and the refractive index n with respect to the light transmission. The abscissa represents the total film thickness D of the laminate film formed by laminating a plurality of films, and the ordinate represents the refractive index n.

FIG. 4 shows the case where the film thickness d of the respective films 11, 12, 13, 14, . . . is equal, and the refractive index n changes stepwise at every boundary between films 11, 12, 13, 14, . . . Thereby, a pseudo refractive index gradient type optical filter can be formed.

FIG. 5 shows the case where the film thickness of the films 11, 12, 13, 14, . . . is different individually and the refractive index n changes stepwise. Thereby a refractive index gradient type optical filter having so-called apodize structure can be formed.

An optical filter that is used practically comprises more number of films to form a laminate, but FIG. 4 and FIG. 5 show simple structures for the purpose of description.

An optical filter having the structure in which the refractive index is uniform in a single film and the refractive index changes stepwise at the boundary between adjacent films can be formed when the film having the relation between the film thickness and the refractive index as shown in FIG. 4 and FIG. 5 is formed according to the present invention. Therefore, the relation between the film thickness of each film and the refractive index n•d can be controlled precisely.

According to the present invention described hereinabove, an optical filter having a laminate comprising a plurality of films in which the refractive index changes stepwise can be formed precisely.

What is claimed is:

1. A method for manufacturing an optical filter in which a plurality of target materials containing a plurality of metal elements are disposed in a chamber of a sputtering apparatus wherein a mix ratio of the metal elements is different individually for each target material, wherein the target material is selected one by one, and wherein a laminate film comprising a plurality of layers having a refractive index that changes stepwise at a boundary between adjacent films is formed on a substrate, wherein the target material is a target material that contains a metal oxide, and wherein the target material is a fine particle mixture of two or more metal oxides.

2. A method for manufacturing an optical filter in which a plurality of target materials containing a plurality of metal elements are disposed in a chamber of a sputtering apparatus wherein a mix ratio of the metal elements is different individually for each target material, wherein the target material is selected one by one, and wherein a laminate film comprising a plurality of layers having a refractive index that changes stepwise at a boundary between adjacent films is formed on a substrate, wherein the target material is an alloy that contains two or more metal elements and oxides.

3. A method for manufacturing an optical filter in which a plurality of target materials containing a plurality of metal elements are disposed in a chamber of a sputtering apparatus wherein the metal elements are different individually for each target material, wherein the target material is selected one by one, and wherein a laminate film comprising a plurality of layers having a refractive index that changes stepwise at a boundary between adjacent films is formed on a substrate, wherein the target material is a target material that contains a metal oxide, and wherein the target material is a fine particle mixture of two or more metal oxides.

4. A method for manufacturing an optical filter in which a plurality of target materials containing a plurality of metal elements are disposed in a chamber of a sputtering apparatus wherein the metal elements are different individually for each target material, wherein the target material is selected one by one, and wherein a laminate film comprising a plurality of layers having a refractive index that changes stepwise at a boundary between adjacent films is formed on a substrate, wherein the target material is an alloy that contains two or more metal elements and oxides.

* * * * *